April 28, 1959  B. G. SMITH  2,883,786
FISH LURE
Filed April 23, 1957
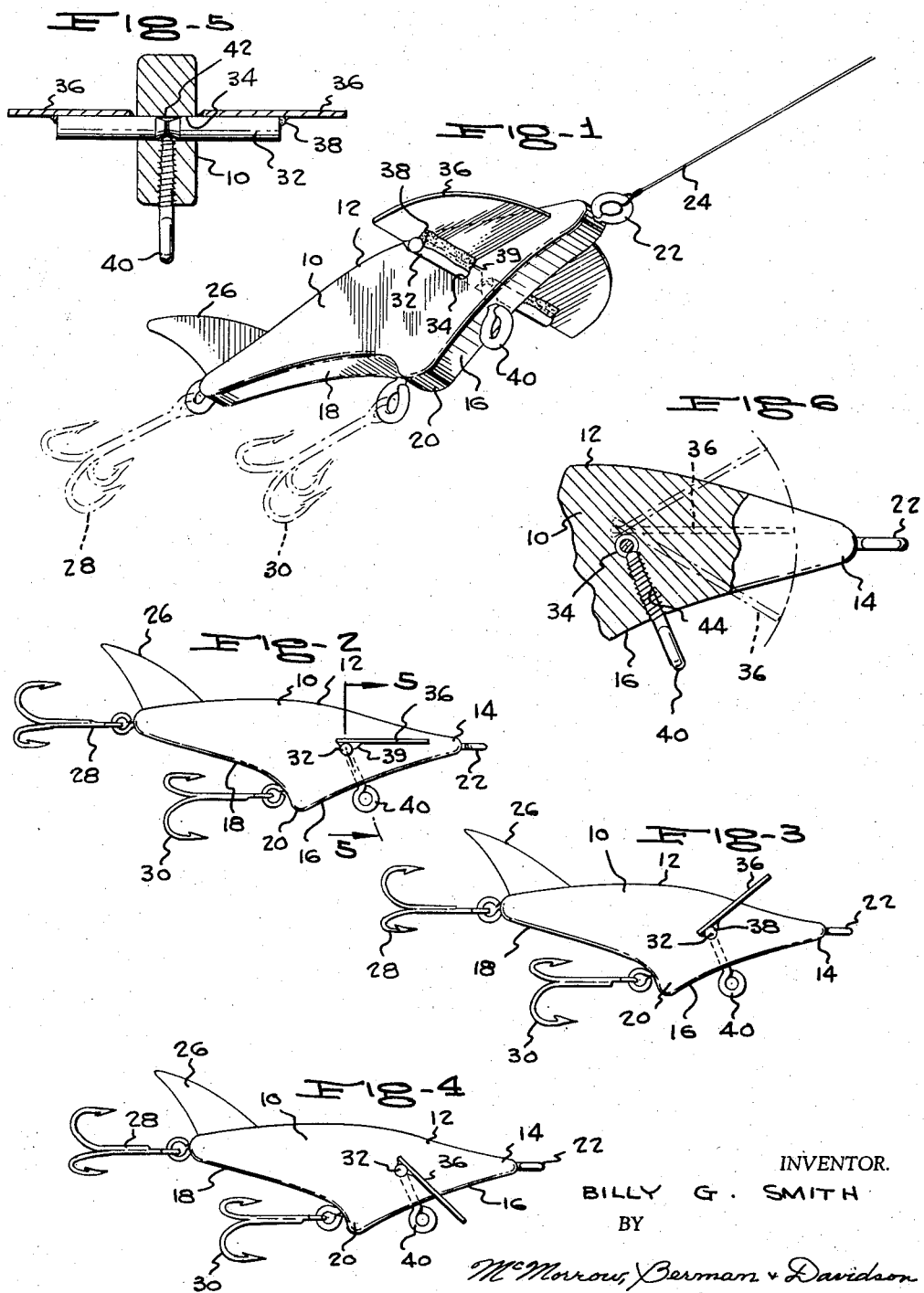
INVENTOR.
BILLY G. SMITH
BY
McMorrow, Berman & Davidson
ATTORNEYS

United States Patent Office 2,883,786
Patented Apr. 28, 1959

2,883,786
FISH LURE

Billy G. Smith, Madison, Mo.

Application April 23, 1957, Serial No. 654,474

1 Claim. (Cl. 43—42.22)

This invention relates generally to fish lures, and more particularly has reference to a lure that is designed to permit operation at any desired level within the water, according to the desires of the particular user.

It has previously been proposed to provide fish lures which can be adjusted so as to travel at any of various desired depths within the water, as well as on the surface, and the broad object of the present invention is to provide a generally improved lure of this type.

Among more specific objects of the invention are the following:

To provide a lure which will be particularly designed to facilitate the making of the necessary adjustments referred to above;

To so form the lure that the adjustments can be made very rapidly, and without requirement of special tools;

To effect a wide range of adjustments, such as to cause the lure to travel either upon the surface, or at any of a number of depths within a substantial range of depths, all by means of comparatively small adjustments in the positions of vanes or blades included in the device;

To so form the lure that in combination with a depth adjustment, there will be a wiggling action which will add to the life-like simulation of a bait fish, and which will further produce sound vibrations during the regular operation of the lure;

To provide an improved mounting of the adjustable blade assembly, such as to conceal the greatest part of said assembly, and insure that the assembly will be effectively locked in each position to which it is adjusted;

To further insure, in the mentioned assembly, against lateral displacement of any component part thereof in a manner that might otherwise tend to foul the vanes of the lure; and To so design the body of the lure that it will have a low center of gravity, such that no matter how the lure lands when cast, it will right itself and will assume a proper operating position.

Other objects will appear from the following description, the claim appended thereto, and from the annexed drawing, in which like reference characters designate like parts throughout the several views, and wherein:

Figure 1 is a perspective view of a lure according to the present invention as seen from below;

Figure 2 is a side elevational view of the lure on a reduced scale;

Figure 3 is a view like Figure 2 in which the vanes have been adjusted to cause operation of the lure as a surface bait;

Figure 4 is a view like Figure 2 in which the vanes have been adjusted for operation of the lure as a diving bait;

Figure 5 is an enlarged transverse sectional view on line 5—5 of Figure 2; and

Figure 6 is a view on the same scale as Figure 5, taken longitudinally through the nose portion of the lure, portions remaining in elevation, the vanes being shown in dotted lines in various positions to which the same are adjustable.

Referring to the drawings in detail, the lure includes a body which, in the illustrated embodiment but not necessarily, is of constant width over its entire area. The body has a particular shape found to produce a desirable low center of gravity therein, and as shown in Figure 1, the body has a top surface 12 which is bowed upwardly substantially from end to end of the body, with a gradual, regular curvature. The top surface 12 merges at its front end into a tapered, rounded nose 14 of the body, the underside of the nose in turn merging into a front lower surface 16 which extends in distance slightly less than half the body, extending from the nose in diverging relation to the top surface 12 and being substantially straight from end to end.

A rear lower surface 18 diverges in respect to the top surface 12 in a direction forwardly from the rounded rear extremity of the body 10, and merges into a depending, rounded projection 20 which is angled so as to project rearwardly to a slight extent, said projection 20 having its front surface defined by the rear end portion of the surface 16, and having its rear surface defined by a downwardly curved extension of the surface 18.

It has been found that this particular formation of the body has a desirably low center of gravity, such that the lure will right itself when cast, and will be held against spiralling during its movement through the water.

Fixedly engaged in the nose 14 is an eye 22, to which is connected the line or lever 24.

At the rear end of the body, there is provided thereon an upwardly, rearwardly projecting, substantially triangular fin 26, which is slightly curved laterally, so as to be oblique to the path of movement of the lure, that is, to the general plane of the body, in a manner such as to impart a wiggling action to the lure, closely resembling the motion of a live bait fish. At the same time, the fin produces sound vibrations within the water, which have been recognized in the art as attracting game fish.

Hooks are applied to the lure as and where thought desirable, and in the illustrated example, there is a rear treble hook 28 connected to the rear end of the body, and a bottom hook 30 connected to the back surface of the depending projection 20, in a position such as to be shielded by the projection 20 from the water encountered during the forward movement of the lure, thereby providing a smooth operation of the lure through the water.

The means whereby the lure is caused to operate either as a surface lure or at any of various depths includes a cross pin 32 (Figure 5), which is rotatably engaged in a transverse opening 34 formed in the body at a location substantially medially disposed between the top surface 12 and the lower front surface 16, and substantially in the plane of the eye 22. The pin 32 projects substantial distances laterally outwardly from opposite sides of the body, and in overlying relation to the projecting portions of the pin are identical fins or vanes 36. The vanes 36 are formed as one-fourth segments of circles, that is, each fin has a straight inner side edge which is parallel to and extends in closely spaced relation to the adjacent side surface of the body, a straight back edge which is normal to the inner side edge, and an arcuate combined forward and outer side edge curving through 90°.

The vanes 36 are so disposed as to have their rear edges almost directly over the pin 32, that is, the greatest parts of the vane areas are disposed forwardly of the pin 32, with the vanes being secured by adhesive, cement, or any other suitable material as at 38 to the pins 32. The cement is built up as clearly as shown at 39, to provide a smooth sloped surface extending from the lowermost portion of pin 32 to the plane of the underside of the vanes 36, so that there will be no pocket or trap tending to produce turbulence in the water, it being desired that the water flow smoothly along the underside of the vanes past the pin 32.

The pin 32 is adapted to be rotated by manipulation of one of the vanes 36 by a user, to locate the vanes in selected planes. In each position to which the pin 32 is rotated, it is locked by means of a set screw 40, which may be provided with an eye on its outer end for attachment of a hook, if desired. The inner end of the set screw 40 engages in a circumferential groove 42 formed in the pin 32 medially between the opposite sides of the body. The set screw is rotatable in a threaded recess or opening 44 of the body, which opening extends radially from the pin and opens upon the surface 16, substantially normally to the plane of the surface 16.

As shown in the various figures of the drawing, the vanes can be adjusted upwardly or downwardly. When in the Figure 2 position, the vanes are in a neutral position. In Figure 3 the vanes are swung upwardly, and in this position, will cause the lure to operate as a surface bait. In Figure 4, the vanes are swung downwardly, to cause operation of the lure as a deep depth lure.

It will be apparent that the construction is adapted to permit selective operation of the lure wherever desired, and of particular importance is the manner in which the vane adjustment is effected, that is, the particular formation and relative arrangement of the set screw 40, pin 32, vanes 36, and cement 38. Also of importance is the particular formation and relative arrangement of the vanes and the body shape. The particular shape of the body, and the particular location of the vanes thereon, taken with the swingable adjustment of the vanes, causes the stable operation of the lure at any desired depth, and insures that it will operate exactly as desired, without possibility of inversion or other malfunctioning.

When the vanes are adjusted to operate the fish lure as a surface bait, and the lure is operating thus, that is, on the surface of the water, the vanes create a wake, or slight turbulence, due to the deflection of the water, which is desirable in attracting fish that are feeding or hunting for food near the surface.

So, even with the fin of the lure completely out of water, the lure will be constantly effective in producing either sound waves, or water turbulences found effective in attracting fish, in any strata of water.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A fish lure comprising a body; a pin extending transversely through the body and adapted to be rotated to selected positions; means for locking the pin in selected positions to which it is turned; vanes rigid with the pin so as to be swingably adjustable to correspondingly selected positions, thus to operate the lure at a selected depth, said vanes having straight rear edge portions along which the pin extends, the vanes having substantially their entire areas disposed forwardly of the pin; hook means carried by the body; and means on the body for attaching a line thereto, said vanes being oppositely but identically formed, and being disposed one at each side of the body, each vane having wholly flat top and bottom surfaces, the pin being disposed wholly at the underside of the vanes in tangentially contacting relation to the bottom surfaces of the vanes, said vanes having a cemented connection to the pin, said connection being built up about the pin and being formed with a smooth surface merging gradually into the plane of the vanes to prevent trapping of water between the pin and vanes.

References Cited in the file of this patent

UNITED STATES PATENTS

| | | |
|---|---|---|
| 445,354 | Moore | Jan. 27, 1891 |
| 1,423,025 | Rodgers et al. | July 18, 1922 |
| 1,870,559 | Drake | Aug. 9, 1932 |
| 2,651,876 | Kohler et al. | Sept. 15, 1953 |
| 2,679,227 | Symonds | May 25, 1954 |
| 2,696,061 | Swenson | Dec. 7, 1954 |

FOREIGN PATENTS

| | | |
|---|---|---|
| 127,635 | Sweden | 1950 |